US009003599B1

(12) United States Patent
Fry

(10) Patent No.: US 9,003,599 B1
(45) Date of Patent: Apr. 14, 2015

(54) VACUUM CLEANER WITH HOSE-RETAINING CASTER MODULES

(71) Applicant: Shop Vac Corporation, Williamsport, PA (US)

(72) Inventor: Kevin D. Fry, South Williamsport, PA (US)

(73) Assignee: Shop Vac Corporation, Williamsport, PA (US)

( * ) Notice: Subject to any disclaimer, the term of this patent is extended or adjusted under 35 U.S.C. 154(b) by 0 days.

(21) Appl. No.: 14/286,304

(22) Filed: May 23, 2014

(51) Int. Cl.
*A47L 9/00* (2006.01)
*B60B 33/00* (2006.01)
*A47L 5/36* (2006.01)
*A47L 9/24* (2006.01)

(52) U.S. Cl.
CPC ................. *A47L 5/365* (2013.01); *A47L 9/248* (2013.01); *A47L 9/009* (2013.01); *B60B 33/0002* (2013.01)

(58) Field of Classification Search
CPC .... A47L 9/009; A47L 9/0036; B60B 33/0002
USPC .............. 15/323; 16/18 R, 29, 31, 38, 39, 43; 211/70.6
IPC ............................ A47L 5/00,9/00; B60B 33/00
See application file for complete search history.

(56) References Cited

U.S. PATENT DOCUMENTS

| 4,845,793 | A | * | 7/1989 | Meyer | 15/328 |
| 5,313,686 | A | * | 5/1994 | Berfield | 15/323 |
| 5,373,606 | A | * | 12/1994 | Bosyj et al. | 15/323 |
| 5,924,165 | A | * | 7/1999 | Gierer et al. | 15/323 |

\* cited by examiner

*Primary Examiner* — David Redding
(74) *Attorney, Agent, or Firm* — Marshall, Gerstein & Borun LLP

(57) ABSTRACT

A new vacuum cleaner has fence elements with upright arms are easily attachable to caster modules and create an upwardly opening hose space through which a vacuum hose can be wound for storage. The caster modules have sockets that extend throughout the height of the modules. The fence elements have tabs that hook onto lower edges of the modules, and can be clipped onto the caster module by pressing a detent on the fence element downwardly into an upper end of the socket until the tabs snap over the lower portion of the module, locking it in place.

6 Claims, 8 Drawing Sheets

VACUUM CLEANER WITH HOSE-RETAINING CASTER MODULES

CROSS-REFERENCE TO RELATED APPLICATIONS

Not applicable.

BACKGROUND OF THE INVENTION

The present invention relates generally vacuum cleaners, and particularly to canister or tank-type vacuum cleaners that roll on casters. Vacuum cleaners are preferably compact, and storage of the vacuum hose on such products is often a concern.

BRIEF SUMMARY

Like some known vacuum cleaners, the new vacuum cleaner has a pair of caster modules that attach to the main body of the vacuum cleaner. Some or all of the modules can be interchangeable. Casters clip into lower ends of each of sockets on each module. Sockets extend throughout the height of the caster module.

The vacuum cleaner has new fence elements are easily attachable to the caster modules and create an upwardly opening hose space through which the vacuum hose can be wound for storage. The fence elements, which can be interchangeable, each have a tab that hooks onto a lower portion (such as a lower edge) of the corresponding caster module. A second, laterally spaced tab can also be provided. The fence element can be clipped onto the caster module by pressing a detent on the fence element downwardly into an upper end of the socket until the tabs snap over the lower portion of the module, locking it in place. Once the connection is made, engagement of the detent in the upper end of the socket and of the tabs on the lower portion locks the fence element in position to the caster module.

The fence element has an arm that extends in an upright position when the fence element is clipped in place. When the caster module is connected to the main body of the vacuum cleaner, the fence element is spaced far enough from the tank to define the upwardly opening hose space.

BRIEF DESCRIPTION OF THE DRAWINGS

The invention may be better understood by referring to the accompanying drawings, in which.

DETAILED DESCRIPTION

Figure 1:
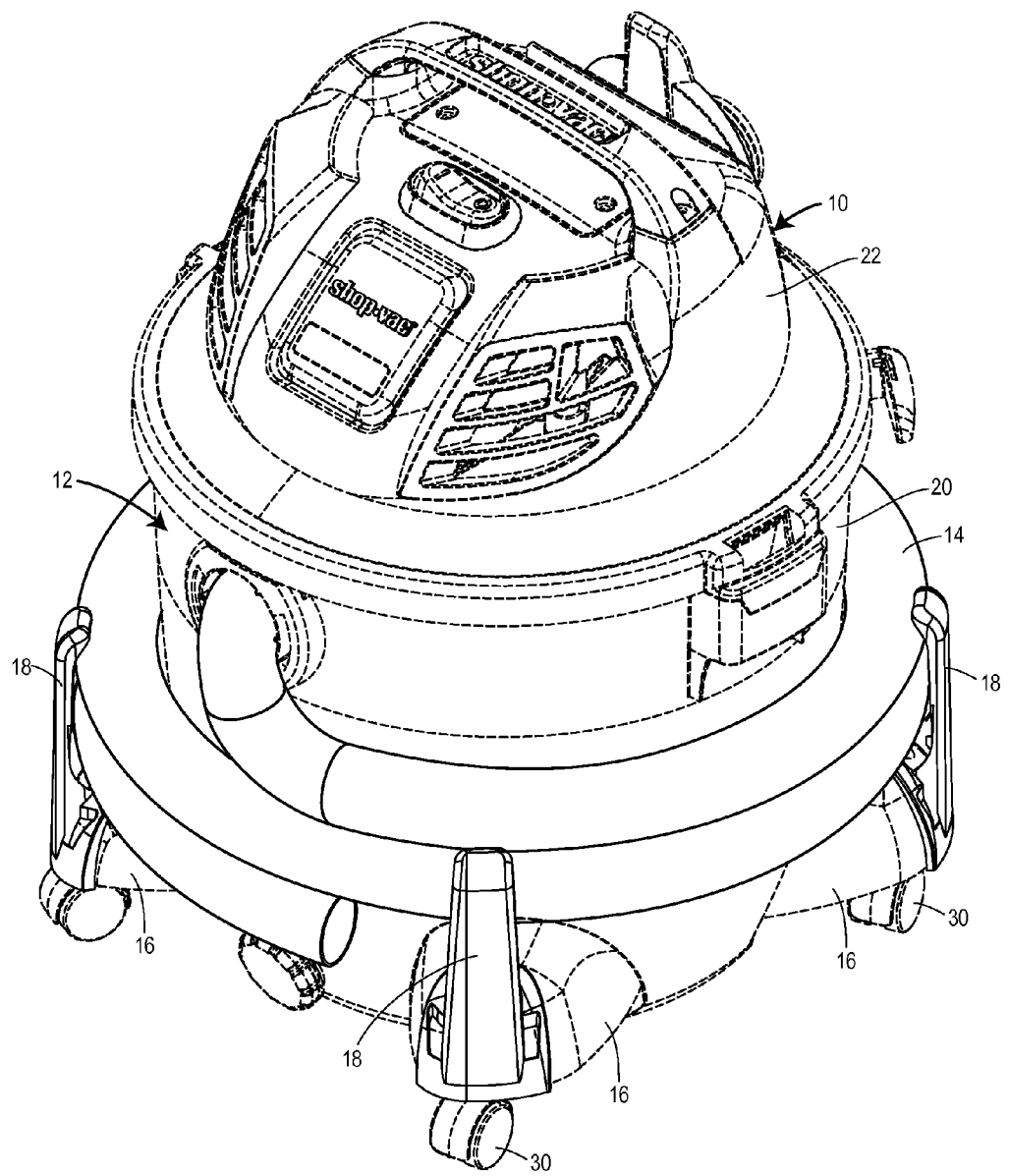
FIG. 1 is an isometric view of a vacuum cleaner that forms one embodiment of the invention.

As seen in FIG. 1, the new vacuum cleaner 10 has a main body 12 with a hose 14, a set of caster modules 16, and a set of fence elements 18. Each will be described in turn.

The Main Body and Hose

As seen in FIG. 1, the main body 12 of the illustrated vacuum cleaner 10 includes a tank 20 and a head 22 that mounts atop the tank. The main body serves as a base for an internal vacuum source, such as an air impeller (not seen) that draws debris through the hose 14 toward the tank. Typically, such vacuum sources operate in the range of 0.5 peak horsepower to 6.5 peak horsepower. However, a rating from 0.2 peak horsepower to 12 peak horsepower would not be extraordinary.

In the illustrated vacuum cleaner 10, the vacuum source resides in the head 22. A wide range of other options are known and can be used. For example, the tank could be in the form of a drawer or cup mounted within the main body 12. Typically, tanks in the illustrated arrangement have a nominal capacity of 1½ to 20 gallons. A capacity from 1 gallon to 65 gallons may be feasible.

The illustrated vacuum hose 14 is generally made of plastic, is generally between 1 and 6 inches in diameter, and between 1 and 20 feet in length. Again, a wide range of options are known and can be used.

The Caster Modules

Figure 3:
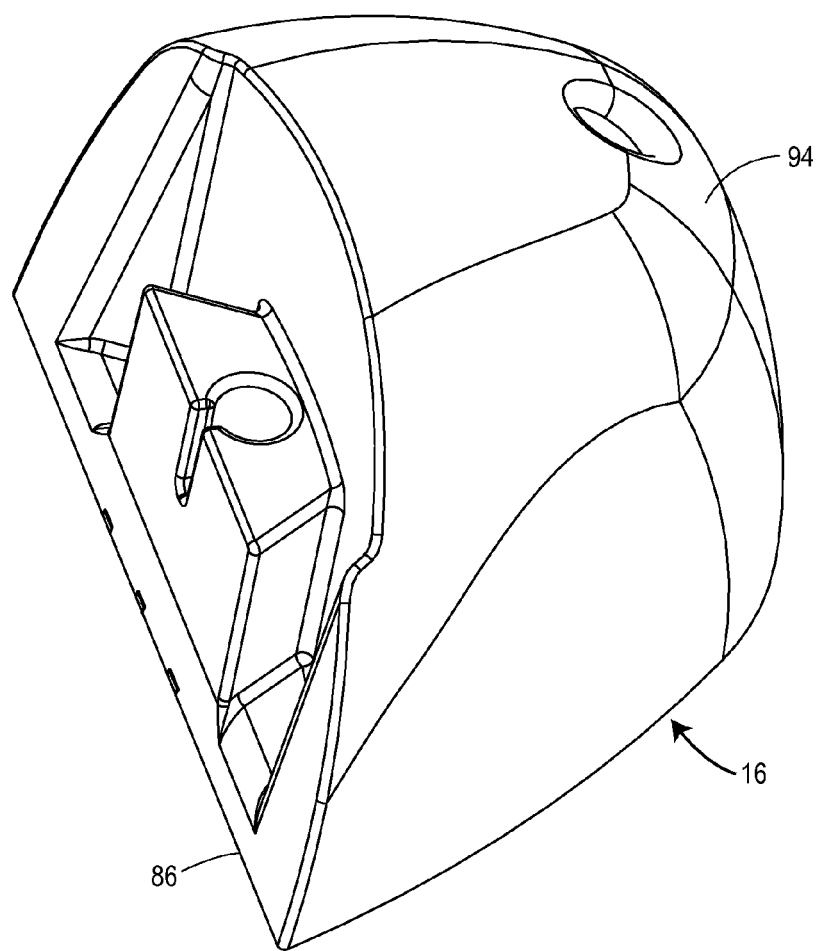
FIG. 3 is an isometric view of a caster module of the vacuum cleaner of FIG. 1.
Figure 4:
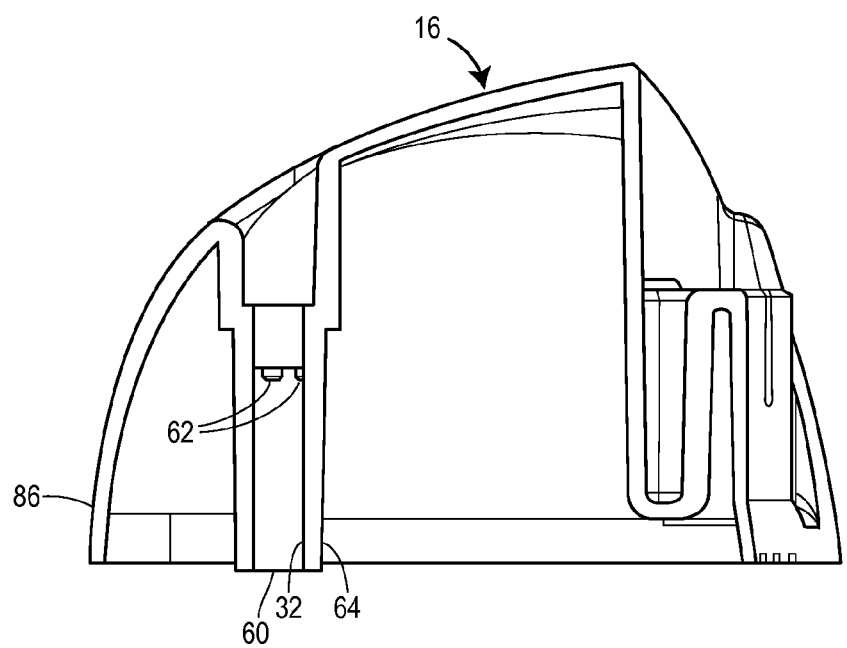
FIG. 4 is a cross-sectional side view of the caster module.

The caster modules 16 (best seen in FIGS. 3 and 4) serve as a base for both casters 30 and for the fence elements 18. The illustrated caster modules each have a caster socket 32 that receives the casters and extends throughout the entire height of the caster module. These caster modules also have structure that enables the modules to be secured to the main body 12 of the vacuum cleaner 10. Alternatively, the caster modules could be an integrally molded part of the main body 12.

Some of the caster modules 16 can be interchangeable. Using identical casters reduces tooling and part-storage expense, simplifying production and reducing production costs.

Figure 5:
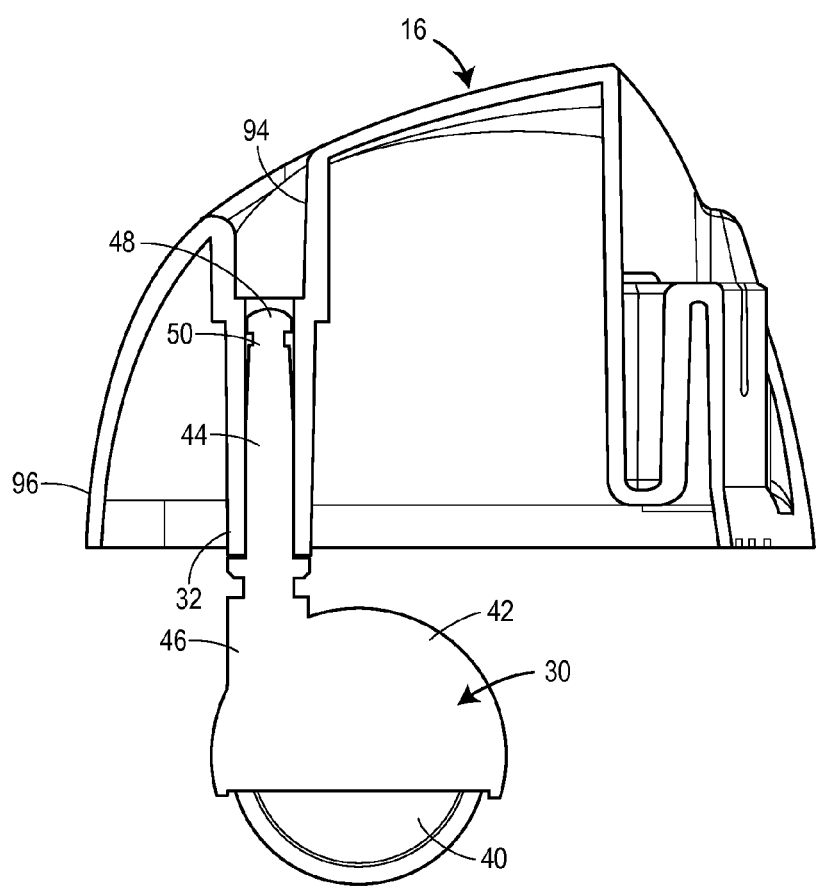
FIG. 5 is a cross-sectional side view of the caster module with a caster mounted in it.

The casters 30 (FIG. 5) support the vacuum cleaner 10 for movement across a floor. The illustrated casters are swivel casters, and are mounted in each of the caster sockets 32. Any of a variety of conventional casters can be used.

Each of the illustrated casters 30 has a wheel 40 mounted to a rig 42. A stem 44 extends upwardly from an off-center fork base 46. The stem has a knob 48 at its upper end, above a locking neck 50.

The illustrated caster sockets 32 each include a conventional structure for holding the stem 44 on the corresponding caster 30 to retain the caster in the socket. Each of the illustrated casters is mounted in one of the caster sockets by inserting the stem of the caster into an aperture 60 at the base of the caster socket and pressing the stem into the caster socket until the knob 48 passes internal projections 62 on the caster socket 32. The internal projections then lock into the locking neck 50 on the stem, trapping the caster in place with the fork base 46 near or adjacent the lower surface of a corresponding boss 64 on the underside of the caster module 16.

The Fence Elements

Figure 2:
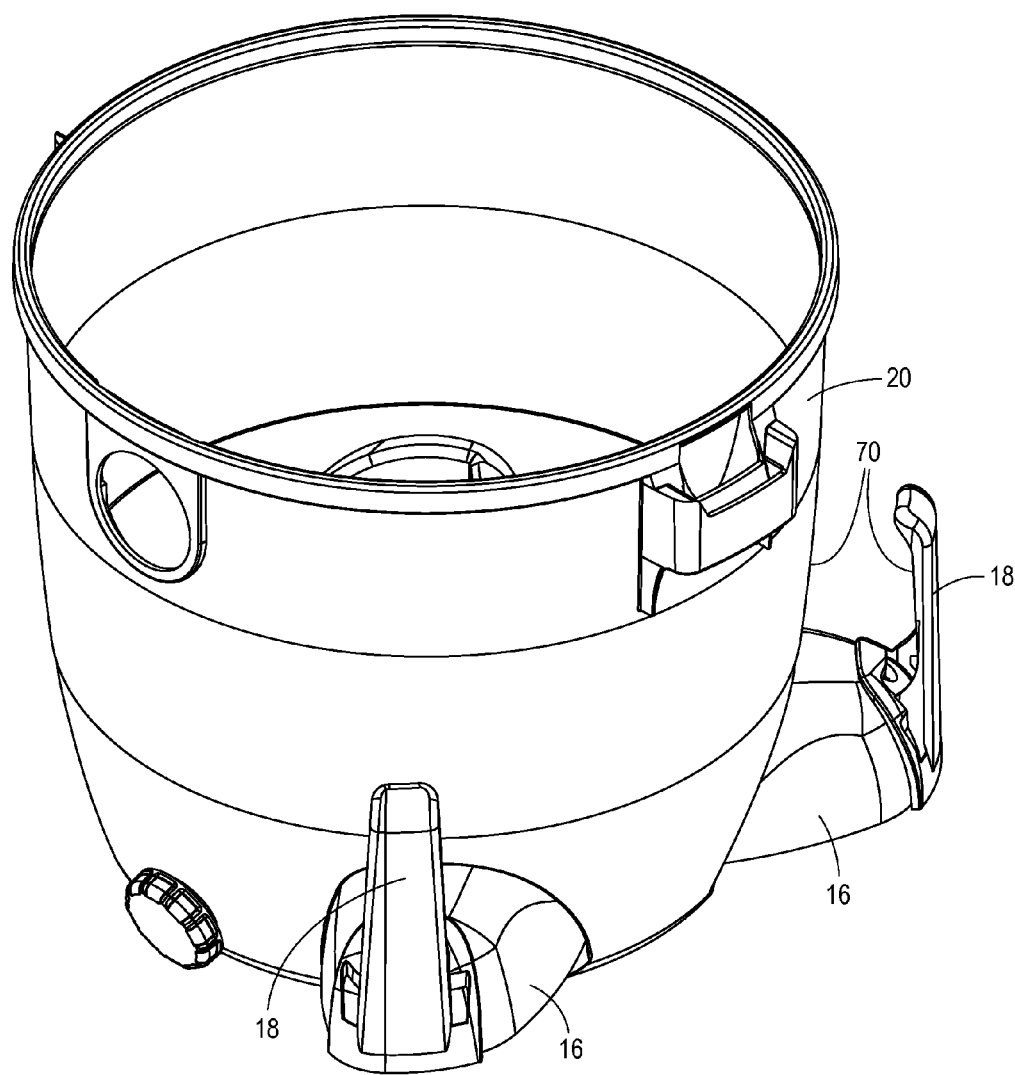
FIG. 2 is an isometric view of the tank and two caster modules of the vacuum cleaner of FIG. 1.

The fence elements 18 define an upwardly opening space 70 (FIG. 2) through which the vacuum hose 14 can be wound for storage between the fence elements and the main body 12 of the vacuum cleaner 10. The illustrated fence elements are made from molded plastic, and are generally interchangeable. Interchangeability reduces tooling and part-storage expense, simplifying production, and reducing production costs.

Figure 6:
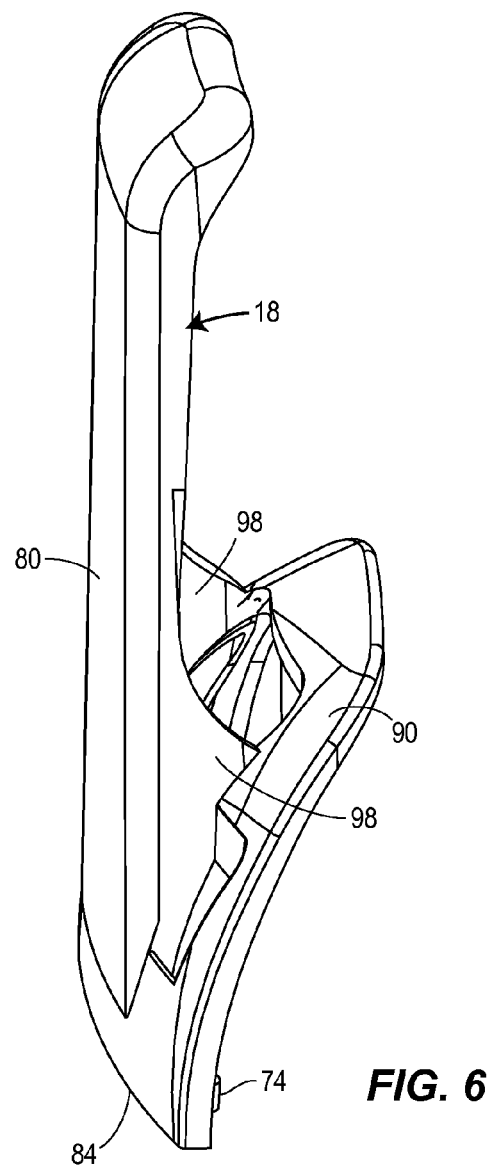
FIGS. 6 and 7 are isometric views of the fence element of the vacuum cleaner.
Figure 7:
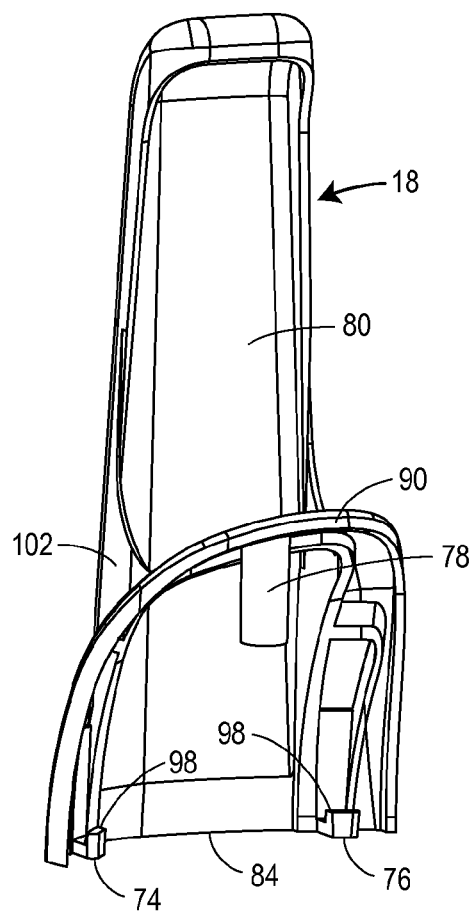

As best seen in FIGS. 6 and 7, each of the illustrated fence elements 18 has a tab 74, an optional second tab 76, a detent 78, and an arm 80.

The optional second tab 76 is laterally spaced from the first tab 74. The two tabs are used to partially secure each fence element 18 to its associated caster module 16. The illustrated tabs are in the form of resilient hooked sections on a lower edge 84 of the fence element. The illustrated tabs may be spaced about ½" to 4 inches apart.

The detent 78 assists in securing the fence element 18 to the caster module 16. The fence element 18 has a central wing 90 that curves between the tabs 74, 76, defining an optional central opening. The illustrated detent is in the form of the downward knob on the central wing that is between ¼ and 3 inches in length, and is positioned about ½" to 6" above the tabs. When the fence element is mounted to the caster module, the detent fits within the upper regions of the caster socket 32.

Figure 8:
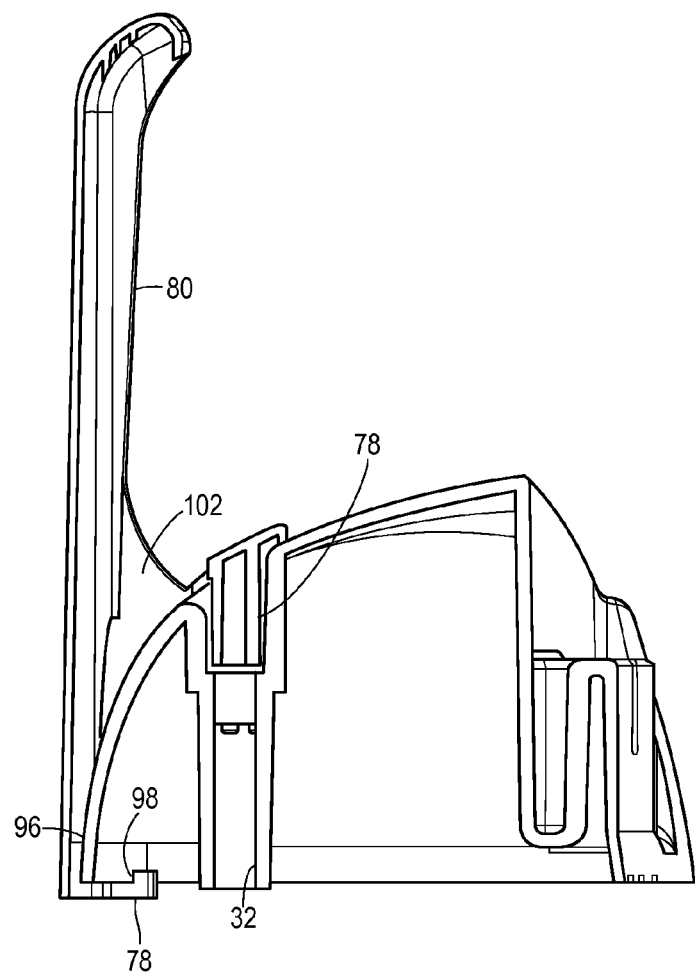
FIG. 8 is a cross sectional view of a fence element mounted on a caster module.

To mount one of the fence elements 18 to its respective caster module 16 (as seen in FIG. 8), the detent 78 is aligned with the open upper end 94 of the caster socket 32 and pressed downwardly into the caster socket. The tabs 76, 78 slide downwardly over an outer wall 96 on the caster module until snapping over $\frac{1}{16}$"-½" thick lower edge of that outer wall. Locking ends 98 on the tabs then lock onto the outer wall, securing the fence element in place on the caster module. While the illustrated caster module 16 has a caster socket 32 that extends throughout the height of the caster module 16, it is also possible to have a separate second socket that extends from the top of the caster element 16, where that second socket serves to mount the fence elements 18. Thus the casters can be mounted in a socket that is aligned with the socket that receives the fence elements 18, as depicted in the drawings, or the sockets can be spaced from each other in a non-aligned relationship.

The arm 80 on the fence element 18 helps to define the upwardly opening hose space 70 and prevents the hose 14 from slipping outwardly from the main body 12 of the vacuum cleaner 10 and then to the floor. The illustrated arm is made of molded plastic and may be between ¼" and 6" wide, between 1" and 8" tall, and generally between ⅛" and ½" of lateral thickness. Optional flange sections 102 on the arm provide additional strength. When the caster modules 16 are connected to the main body 12 of the vacuum cleaner 10, and the fence elements are clipped in place to the caster modules, the illustrated arms extend in an upright position, and are spaced far enough from the main body to define a suitable upwardly opening hose space. The lateral spacing between the main body and the inside surface of the arm should be at least equal to the diameter of the hose 14. To minimize overall product width, the lateral spacing is preferably no more than two times that diameter. In this example, the lateral distance between the arms and the main body is between 1" and 6".

This description of various embodiments of the invention has been provided for illustrative purposes. Revisions or modifications may be apparent to those of ordinary skill in the art without departing from the invention. The full scope of the invention is set forth in the following claims.

The invention claimed is:

1. A vacuum cleaner comprising:
a main body that has a vacuum source that draws debris through a vacuum hose and into a receptacle;
caster modules that each have a first socket that extends from a lower end near the bottom of the caster module and a second socket at an exposed upper end on an upper surface of the caster module;
fence elements that each have an arm, a detent that fits within an upper end of the second socket on an associated caster module, and a tab that hooks onto a lower part of the respective caster module, locking each fence element to its respective caster module with the arms of the fence elements in upright positions and spaced from the tank, defining an upwardly opening space between the arms and the tank through which the hose can be wound for storage.

2. A vacuum cleaner as recited in claim 1, in which; the vacuum cleaner also has casters that clip into lower ends of at least some of the caster sockets.

3. A vacuum cleaner as recited in claim 1, in which; the fence elements are interchangeable with each other.

4. A vacuum cleaner as recited in claim 1, in which; each of the fence elements has a pair of laterally spaced hooked tabs that each hook to a lower edge on the respective caster module.

5. A vacuum cleaner as recited in claim 1, wherein the first socket and the second socket are aligned.

6. A vacuum cleaner comprising:
a main body that has a vacuum source that draws debris through a vacuum hose and into a tank;
caster modules that each connect to the main body and have a caster socket that extends from a lower end near the bottom of the caster module throughout the height of the caster module to an exposed upper end on an upper surface of the caster module;
casters that clip into the lower ends of the sockets;
interchangeable fence elements that each have an arm and a pair of laterally spaced hooked tabs;
a detent on each of the fence elements seats in the exposed upper end of the caster socket of an associated socket module; and
tabs on the fence elements that hook to a lower edge of the associated caster module, locking the fence elements to the associated caster modules with the arm in an upright position and spaced from the main body, partially defining an upwardly opening space between the arm and the main body through which the hose can be wound for storage.

* * * * *